Figure 1:
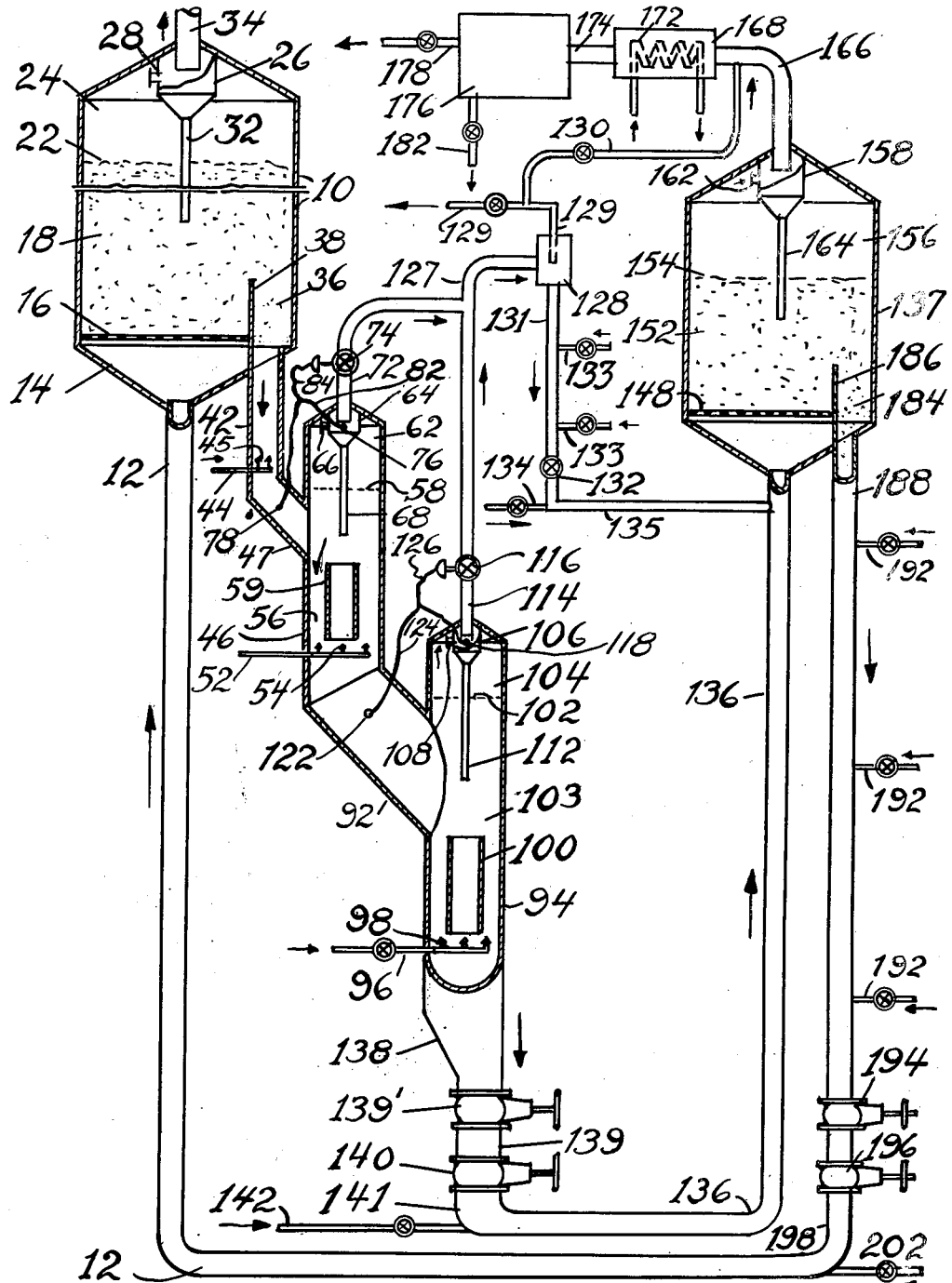

Feb. 26, 1952    J. WEIKART    2,587,554
APPARATUS FOR STRIPPING FINELY DIVIDED SOLIDS
Filed Oct. 23, 1945    2 SHEETS—SHEET 2

John Weikart Inventor
By R. J. Whelan Attorney

Patented Feb. 26, 1952

2,587,554

UNITED STATES PATENT OFFICE 2,587,554

APPARATUS FOR STRIPPING FINELY DIVIDED SOLIDS

John Weikart, Elizabeth, N. J., assignor to Standard Oil Development Company, a corporation of Delaware Application October 23, 1945, Serial No. 624,045

1 Claim. (Cl. 23—288)

This invention relates to contacting gaseous fluid with finely divided solids, and, more particularly, relates to catalytic reactions, such as catalytic conversion of hydrocarbons wherein the hydrocarbons are converted, the catalyst or contact particles are partially or completely stripped of entrained or adsorbed hydrocarbons, and the stripped catalyst or contact particles are regenerated for reuse in the conversion operation.

According to one form of my invention, spent or contaminated catalyst particles are withdrawn in a dense fluidized condition from a reaction zone and are passed through one or more stripping stages while maintaining a fluidized column of particles which column acts as a standpipe to develop hydrostatic pressure at its base to compensate for the loss of pressure due to the circulation of the catalyst particles through the system.

According to another form of my invention, spent or contaminated catalyst or contact particles are regenerated by passing them through one or more regeneration stages while maintaining a fluidized column of particles, which column acts as a standpipe to develop hydrostatic pressure at its base. The regeneration system may be used to supplement existing regeneration systems or may be substituted for known regeneration systems in new installations.

In the newer type of catalytic cracking units where catalyst or contact particles are withdrawn as a dense fluidized mixture or suspension from the dense turbulent mixture in the reaction zone, the stripping of the spent or contaminated catalyst particles has not been as effective as in the older type catalytic cracking units. The inefficiency of the stripping vessel allows hydrocarbon material to pass to the regenerator where the hydrocarbon material uses up carbon or coke burning capacity and limits either the reactor feed rate or reactor conversion.

The stripping vessels now in use on the newer catalytic cracking units discharge the stripping gas and stripped out material directly into the reactor, and since the reactor gas velocity is limited, an increase in stripping gas may be accompanied by a decrease in feed rate. With my improved stripping design, most of the stripping gas does not enter the reaction zone.

In present designs, steam is used as a stripping gas because it can be condensed out of the reaction products and does not overload the fractionating equipment. With my invention, I may use a fixed gas or other inert gas because the stripping is done in separate stages and there is no undesirable reaction zone dilution or overload on the fractionating equipment.

With my new stripping design the catalyst or contact particles undergoing stripping are maintained in a fluidized condition to act as a standpipe, which is necessary for flow control.

A structure similar to the stripping design above described may be used to replace or supplement known regeneration equipment. The catalyst or contact particles in dense fluidized condition are withdrawn from a regeneration zone and passed through one or more stages of additional regeneration zones wherein fresh regeneration gas is added to each stage and combustion gas or flue gas is withdrawn from each stage. During regeneration in the stage or stages, the contact or catalyst particles are maintained in a dense fluidized condition to function as a standpipe.

In my invention, the zones used in the stages can be of the same size or may increase or decrease in size in either direction. Preferably, the vessels used in the stage operation are provided with baffles to reduce undesirable swirling or eddy currents.

Figure 2:
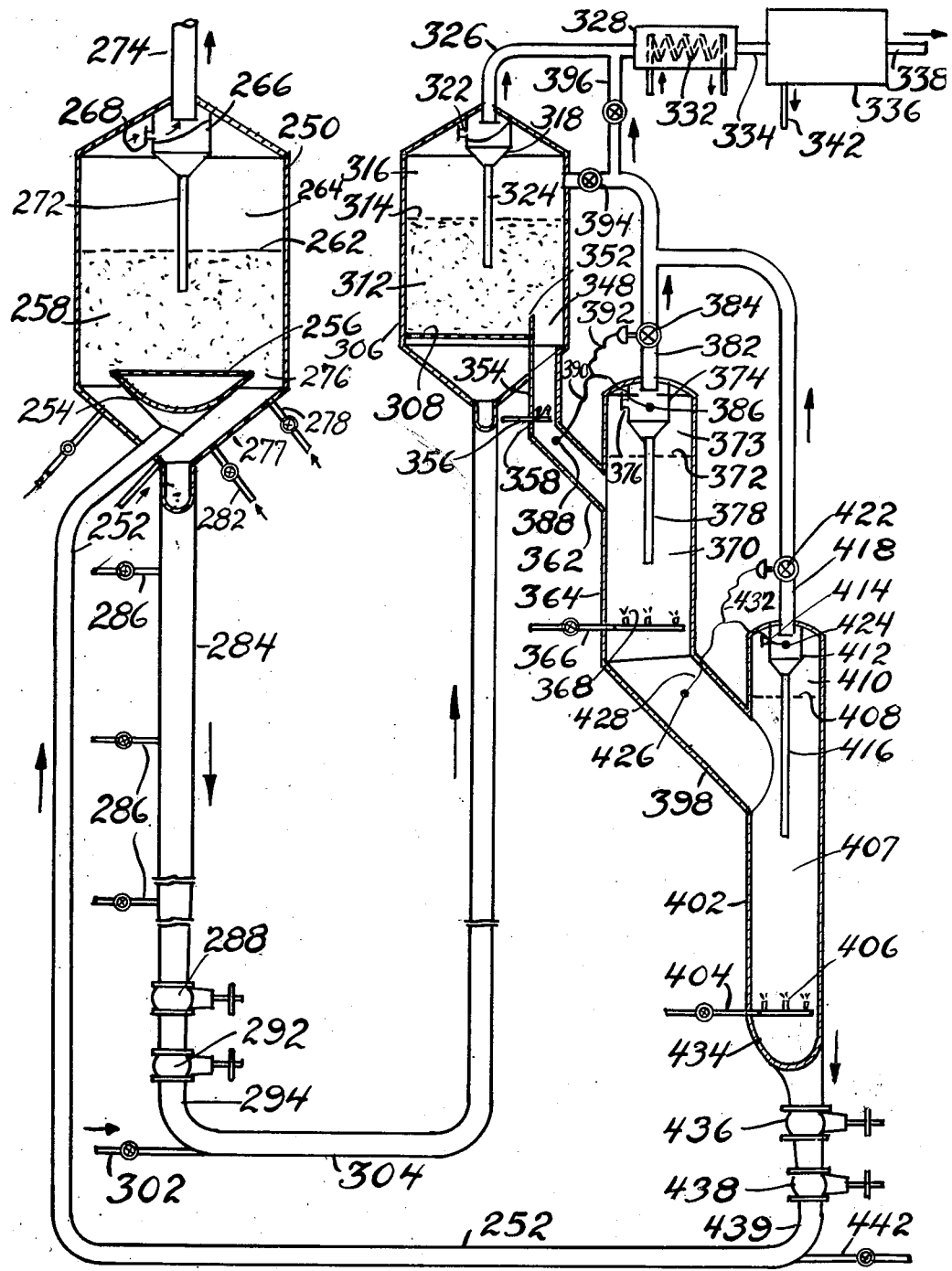

In the drawings:

Fig. 1 represents a vertical longitudinal cross-section of one apparatus including my improved stripping design; and Fig. 2 represents a longitudinal vertical cross-section of another form of my invention including my improved regeneration design.

Referring now to the drawing, the reference character 10 designates a reaction vessel provided with an inlet line 12 which communicates with the conical bottom 14 of the reaction vessel 10. The gaseous or vaporous reactants are passed through line 12 either alone or in admixture with finely divided solid contact or catalyst particles. When a mixture is used, it is passed upwardly through the distribution plate member 16 which is arranged in the bottom of the reaction vessel 10.

My invention may be used for a large number of reactions which are carried out in the presence of catalyst or contact material. My invention will be specifically described in connection with the catalytic cracking or conversion of hydrocarbons, but it is to be understood that my invention is not limited thereto. When using my invention for the catalytic cracking of hydrocarbons, the hydrocarbon feed may be in the form of vapors or preheated hydrocarbon liquid. When the feed is liquid or partly in liquid and vapor form, a sufficient amount of hot regenerated catalyst particles is used to vaporize the oil and supply the heat of cracking.

A hydrocarbon feed, such as gas oil having an initial boiling point of about 450° F. and a final boiling point of about 750° F. and an A. P. I. gravity of 32°, is passed through line 12 together with a sufficient amount of a cracking catalyst in divided form to effect the desired extent of cracking. The catalyst may be acid-treated bentonite clay, or synthetic silica alumina gels, synthetic silica magnesia gels, etc. Preferably, the catalyst is in finely divided form having a particle size between about 200 and 400 standard mesh, but finer or coarser material may be used.

The velocity of the hydrocarbon gaseous fluid passing upwardly through the reaction vessel 10 is selected to maintain the solid particles as a dense dry fluidized liquid-simulating mixture 18 having a level designated at 22. Above the level 22 is a dilute phase or dispersed phase and comprises vaporous reaction products containing only a small amount of entrained catalyst particles.

When using silica alumina gels in the finely divided particle size above described, the superficial velocity of the gaseous fluid passing upwardly through the reaction vessel 10 may be between about 0.5 ft./second and 1.5 ft./second. The superficial velocity is that velocity when the reaction vessel 10 is empty and contains no solid particles. The dense fluidized mixture 18 has a density of about 14 lbs./cu. ft. to 35 lbs./cu. ft., depending on the velocity selected. The temperature in the reaction zone may be between about 800° F. and 1000° F., preferably 925° F.

To convert the gas oil to about 45 volume per cent gasoline, the hydrocarbon vapors remain in the reaction zone 10 in contact with the catalyst for about 5–25 seconds. The vaporous reaction products pass from the dilute phase 24 into a separating means 26 which is shown in the drawing as a cyclone separator arranged in the upper part of the reaction vessel 10. Instead of the cyclone separator, a Multiclone separator may be used or a plurality of either form of separators may be used in series. The vaporous reaction products containing entrained catalyst particles pass through inlet 28 into the separating means 26 for separating most of the catalyst particles from the vaporous reaction products. The separated solid particles are returned to the dense bed or mixture 18 through dip pipe 32 which extends below the level 22 of the dense mixture in the reaction vessel 10.

The dry vaporous reaction products pass overhead through outlet 34 and are passed to suitable separating means, such as fractionating equipment, for separating the desired products from higher and lower boiling hydrocarbons. The vaporous reaction products passing overhead through line 34 contain a small amount of entrained catalyst particles and these are usually removed in the lower part of the fractionator by being scrubbed out by condensate oil and recovered as a slurry. The catalyst particles may be recovered from the slurry in any suitable manner.

During the catalytic conversion of hydrocarbons, the catalyst or contact particles become coated with solid coke or carbonaceous material which reduces the activity of the catalyst particles. It is necessary to regenerate the particles before reusing them in another conversion operation. However, before regenerating the particles, it is preferred practice to strip or purge the catalyst particles to remove entrained or adsorbed hydrocarbon vapors and gases.

The contaminated catalyst or contact particles are withdrawn from the dense bed or mixture 18 by means of a well 36 formed by partition or baffle 38 in the reaction vessel 10. The baffle 38 extends above the distribution plate 16 and preferably extends across the width of the cylindrical reaction vessel 10. The withdrawn dense fluidized mixture is introduced into the upper portion of a column 42 during withdrawal from the reaction vessel 10. Near the bottom of the column 42 a stripping and fluidizing gas may be passed through line 44 and introduced into the bottom of the column by means of a circular distribution member having openings 45.

Usually it will not be necessary to add gas through line 44 because a sufficient amount of gas passes into column 42 from the next lower stripping section 46 presently to be described.

If a gas is introduced through line 44 it may be any suitable stripping gas, such as steam, light hydrocarbon gases, inert gases, such as oxygen-free flue gas, nitrogen, carbon dioxide, carbon monoxide or mixtures thereof. The gas introduced into column 42 maintains the particles in dry fluidized liquid-like condition and at the same time effects some stripping of the solid particles.

The particles in fluidized condition pass as a confined stream from the bottom of the column 42 through a downwardly inclined conduit 47 and are introduced into a lower offset separate stripping vessel 47 which is preferably cylindrical in form. A suitable stripping gas is introduced into the lower portion of the separate stripping vessel 46 through line 52 which feeds the stripping gas through a distributing ring 54 provided with openings for introducing the gas into the dense fluidized mixture in the stripping vessel 46. Other forms of distributing means may be used.

The solid particles are maintained as a dense fluidized mixture indicated at 56 with a level 58 extending above the point of introduction of the fluidized material through conduit 47. In other words, the level of the fluidized mixture in the vessel 46 is above the opening into conduit 47 to maintain a continuous column of fluidized particles during stripping while preventing any by-passing of the stripping gas and preventing any large amount of gas from passing from the stripping vessel 46 to the reactor 10 by means of the conduit 47 and column 42. As will be hereinafter pointed out, about one-half the total gas in stripper section 46 passes upwardly through column 42 with the level of the fluidized solids as shown at 58.

The stripping vessel 46 is preferably provided with a cylindrical baffle means 59 which is arranged above the distributing ring 54 and below the inlet of conduit 47. The baffle 59 is preferably used where the stripping vessel 56 is of a large diameter in order to cut down or minimize swirling or eddy currents. Instead of being cylindrical, the baffle means may be in the form of parallel plates extending across the stripping vessel 46 and having a depth about the same as the baffle cylindrical member 59.

For stripping or purging catalyst particles from a catalytic cracking operation, the amount of stripping gas used is about 2–5 lbs. of stripping gas per 1000 lbs. of catalyst. Or the catalyst flowing downward against the upflowing gas is about 200–1000 lbs./sq. ft./minute. The superficial velocity of the stripping gas may vary between about 0.5 ft./second and 1.5 ft./second, and the density of the fluidized material in the vessel 46 may vary between about 15 lbs./cu. ft. and 35 lbs./cu. ft., depending on the velocity selected. The stripping gas is preferably a fixed gas, such as oxygen-free flue gas, nitrogen, etc., but other stripping gases may be used, such as steam, carbon dioxide, etc. In the lower stripping cells or sections (away from the reaction zone 10, small quantities of air may be tolerated.

About one-half stripping gas and stripped out material leaves the dense bed or mixture 56 and passes into the separating space 62 as a dilute suspension or disperse phase and contains only a small amount of entrained catalyst particles. To recover most of the entrained particles, the stripping gas and stripped out material is introduced into separating means 64 through inlet 66. The separating means 64 is shown as a cyclone separator arranged in the upper part of the stripping vessel 46. Other forms of separating means, such as Multiclone separators, may be used, or cyclone separators in series may be used. The separated solids are collected in the bottom of the separator 64 and returned to the dense mixture 56 in the stripping vessel 48 through dip pipe 68 which extends below the level 58 of the dense mixture in the vessel 48.

The separated stripping gas and stripped out material pass overhead through line 72 provided with a throttling valve 74. The throttling valve is used to control the pressure in the top of the stripping vessel 46 and to maintain gas distribution between the gas passing from the stripping vessel 46 and leakage through conduit 47 to the reaction vessel 10. At the same time, the throttle valve holds a level of catalyst above the outlet end of line 47 to the stripping vessel 46.

The control means comprises a pressure responsive element 76 in the separating means 64 and another pressure responsive means 78 arranged in the upper portion of the conduit 47. Element 76 will be under a lower pressure than element 78. The elements 76 and 78 are connected by means diagrammatically shown at 82 which in turn is connected to the throttle valve 74 by control means or system shown diagrammatically at 84. Means 82 maintains the desired pressure differential between points 76 and 78. If the pressure in the space 62 in the stripping vessel 46 increases above the normal or desired figure, the level 58 of the fluidized mixture would be depressed, and if no control were provided, there would be bypassing of gas from the stripping vessel 46 to the reaction vessel 10 and there would be loss of pressure head in the column 42. Under these conditions, the throttle valve 74 is opened to a greater extent by the control means 84 to permit release of the pressure in the space 62.

Conversely, if the pressure in space 62 decreases, the catalyst level 58 would be elevated and might cause flooding of the cyclone separator 64 if no control valve were used. With the control valve under these conditions, the valve 74 is closed a certain amount and pressure is built up in the space 62 to the normal amount.

For example, if there is an upward surge of pressure in reaction zone 10, the pressure increases at the point 78 and this will cause pressure increase at upper portion of the fluidized solids in the stripping section 46. As a result of the pressure increase in section 46, the catalyst level 58 starts to move up to increase the pressure head and might continue to rise and flood cyclone separator 64. However, the pressure control means 82 function to maintain the desired pressure differential between points 76 and 78 and this results in closing of throttle valve 74 by control means 82 until the desired pressure differential is reestablished between points 76 and 78. When pressure in reactor returns to normal, the above steps are reversed.

If the pressure fluctuations in the reactor were small, movement of level 58 would keep the system in balance. The control valve provides an extremely flexible system and provides means for handling any pressure fluctuation without flooding the cyclone separator or without breaking the continuity of the catalyst column. In addition, if stripping gas rate changes, the control valve automatically compensates for the increased flow of gas through it.

Because the pressures at a point in line 47 and at a point at the same level in the fluidized body 56 in section 46 are the same, and because of this pressure balance, 50% of the total gas in section 46 passes up through inclined line 47 to the reacter 10 and 50% of the total gas passes into space 62 and through separator 64.

From the bottom of the first offset stripping vessel 46, the partially stripped dense fluidized catalyst or contact particles flow down as a confined stream through another inclined conduit 92 which communicates with the upper portion of a lower second offset stripping vessel 94. Stripping gas, such as steam, nitrogen, carbon dioxide, etc., is introduced into the bottom portion of the stripping vessel 94 through line 96 provided with a distributing ring having spaced openings 98. The stripping vessel 94 is also preferably provided with a baffle means 100 which may be in cylindrical baffle or which may comprise transverse baffles as above described in connection with the first stripping vessel 46.

The particles undergoing stripping or purging in the second vessel 94 are maintained in a dense fluidized liquid-like condition having a level indicated at 102 above the outlet end of the inclined conduit 92. The dense fluidized mixture is indicated at 103. Above the level 102 is a dilute or disperse phase 104 comprising stripping gas and stripped-out volatile material containing a small amount of entrained catalyst particles. To recover most of the particles entrained in the gas, the gas is passed into separating means 106 through inlet 108. The separating means is shown in the drawing as a cyclone separator but other separating means, such as a Multiclone separator, may be used or a plurality of separators in series may be used.

The density of the fluidized mixture in the second stripping vessel 94 is substantially the same as the density of the mixture above given in the description of the operation of the first stripping vessel 46. Also the velocity of the upflowing stripping gas and the amount of stripping gas used are about the same in the second stripping vessel 94 as given in the description of the operation of the first stripping vessel 46.

The separated catalyst particles collect in the cyclone separator 106 and are returned to the dense mixture 103 in the second stripping vessel 94 through dip pipe 112 which extends below the level 102 of the dense mixture in the vessel 94. The stripping gas and stripped-out volatile material pass overhead through line 114 provided with a throttle control valve 116 for controlling the pressure in the upper portion of the second stripping vessel 94. In vessel 94 the pressure balance is maintained so that half the total gas passing up through vessel 94 goes to the next higher stripping vessel 46 and the other half of the gas passes to cyclone separator 106 as above described in connection with vessel 46 and column 42

The control valve 116 is similar in its construction and operation to the control valve 74 above described in connection with the first stripping vessel 48. The control means associated with the control valve 116 comprises pressure responsive element 118 in the cyclone separator 106, pressure responsive element 122 in the conduit 92, means 124 connecting the pressure responsive elements 118 and 122 for maintaining a desired pressure differential, the means 124 being connected to the control valve 116 by control means diagrammatically shown at 126.

The stripping gas and stripped-out volatile material leaving the first stripping vessel 46 through line 72 and leaving the second stripping vessel 94 through line 114 are combined and passed through line 127 to a separating means 128 for recovering entrained catalyst particles from the stripping gas and stripped-out volatile material. The stripping gas and the stripped-out volatile material pass overhead through line 129 and may be passed into a scrubbing zone (not shown) for scrubbing with water or oil to recover entrained catalyst particles and to recover any hydrocarbons which may be stripped out of the spent catalyst particles.

If the quantity and quality of the recovered hydrocarbons warrant recovery, the stripping gas may be passed to the outlet 34 from reaction vessel 10 and the hydrocarbons recovered with the vaporous reaction products leaving the reaction zone 10. If there is an insufficient amount of hydrocarbons present in the stripping gas, the stripping gas may be passed through line 130 and entrained catalyst particles recovered in the recovery system for the regeneration gases, as will be presently described in connection with the regeneration of the catalyst particles.

The catalyst particles separated in the separation means 128 are passed to a standpipe 131 provided with a control valve 132 at its lower portion. The particles are maintained in a fluidized condition in the standpipe 131 by introducing fluidizing gas at spaced points into the standpipe 131 through lines 133. The recovered particles are mixed with a regenerating gas introduced below the control valve 132 through line 134 and the dilute suspension is passed through line 135 to line 136 leading to the regeneration zone or vessel 137 presently to be described. Instead of returning the catalyst particles to line 136, they may be recovered in other ways and may be returned to other parts of the system as, for example, to the lower portion of the second stripping vessel 94 below the distribution ring 98.

The stripped catalyst particles flow downwardly from the bottom of the second stripping vessel 94 into a pipe having a smaller cross-sectional area formed by the inclined wall 138. The catalyst or contact particles, during passage through the first stripping vessel 46 and the second stripping vessel 94, are maintained in a dense fluidized condition as a continuous column so that the stripping vessels act as a standpipe for developing hydrostatic pressure at the bottom of the second stripping vessel 94. In this way stripping is carried out in a modified standpipe while hydrostatic pressure is being built up to pass the stripped particles to the regeneration step.

The pipe with the inclined side 138 conducts the fluidized material into short standpipe 139 provided with a safety slide valve 139' and a control slide valve 140 for controlling the rate of removal of the catalyst particles from the second stripping vessel 94. The safety control valve 139' is provided for emergency purposes for completely shutting off the unit in the case of an emergency. The fluidized particles, after passing through the control valve 140, are at a slightly lower pressure than exists above the valve 140 and under this smaller pressure the particles are introduced into space 141 wherein they are mixed with regenerating gas, such as air introduced through line 142. The less dense suspension is then passed through line 136 and upwardly into the lower portion of regeneration vessel 137 and below the distribution plate 148 in the regeneration vessel 137.

The superficial velocity of the regenerating gas is selected to be between about 0.5 ft./second and 2.0 ft./second to maintain the catalyst particles as a dense fluidized liquid-simulating mixture shown at 152 and having a level indicated at 154. The density of the mixture in the regeneration zone 137 may be between about 12 lbs./cu. ft. and 30 lbs./cu. ft., depending on the velocity of the regenerating gas.

Above the dense mixture 152 is a dilute phase or a disperse phase 156 containing regeneration gas with a small amount of entrained catalyst particles. To recover most of the entrained particles the dilute suspension is passed into separating means 158 through line 162 and the separated solids are returned to the dense mixture 152 through dip pipe 164. The regeneration gases or flue gas pass overhead through line 166 and as it still contains some entrained catalyst particles, it is preferable to pass the regeneration gas through an additional separation step. The stripping gas and stripped out gas or volatile material leaving the separation means 128 through line 130 as above described, may be introduced into line 166 for recovery of entrained particles in the separation step about to be described.

The temperature during regeneration, when regenerating a cracking catalyst such as silica alumina gel, is between about 1000° F. and 1150° F. The hot regeneration gases at a temperature of about 1000° F. to 1150° F. passing through line 166 are preferably cooled by being passed through heat exchanger 168 containing a heat exchange element 172 before being passed through line 174 to the separation step 176.

The last separation step mentioned is carried out in an electrostatic precipitator for substantially completely recovering all of the entrained catalyst particles from the hot regeneration gases. The regeneration gases leave the separator 176 through line 178 and may be passed to the atmosphere or may be passed to a waste heat boiler for recovering some of the heat therefrom. The separated catalyst particles are withdrawn from the separator 176 through line 182 and may be recovered as such or may be returned to any suitable part in the system as, for example, to the regeneration zone 137 or the reaction vessel 10.

The hot regenerated catalyst particles are withdrawn from the dense bed or mixture 152 by means of well 184 formed at the bottom portion of the regeneration vessel 137 by baffle plate 186 which extends above the distribution plate 148 and across the width of the cylindrical regeneration vessel 137. The hot regenerated catalyst particles are passed into standpipe 188 wherein they are maintained in a dense fluidized condition by the introduction of an aerating gas, such as air, through lines 192. The standpipe 188 is used to build up the pressure on the particles to facilitate returning them to the reaction vessel 10. The particles are maintained in a fluidized condition and develop hydrostatic pressure at the base of the standpipe 188.

The bottom portion of the standpipe 188 is provided with a safety slide valve 194 and a control slide valve 196 for controlling the rate of withdrawal of catalyst particles from the base of the standpipe 188. In passing through the slide valve 196, there is a drop in pressure and the pressure in the pipe 198 below the valve 196 is slightly less than the pressure above the valve 196. The hot regenerated catalyst particles from the pipe 198 are mixed with a gas or vapor introduced through line 202 to form a dense suspension which is passed through line 12 into the reaction vessel 10. The fluid introduced through line 202 may comprise the hydrocarbon feed, as vapors or liquid, which is to be cracked or converted in the reaction vessel 10. If desired, a dispersing medium, such as steam, may be introduced through line 202 for carrying the catalyst particles to the reaction vessel 10 and the vapor or liquid feed may then be introduced into the body of the fluidized mixture 18 in the reaction vessel 10.

While I have shown the separate stripping vessels 46 and 94 in connection with the reaction vessel 10, similar apparatus may be used for carrying out the regeneration of the contaminated particles, that is, the regeneration may be carried out in separate stages arranged one below the other. The system using such separate stages may be used on either or both the reaction and regeneration sides.

In Fig. 2 I have shown my invention applied to the regeneration side of a catalytic conversion system. In Fig. 2 the reference character 250 designates a cylindrical reaction vessel provided with an inlet line 252 extending into the bottom portion of the reaction vessel 250 and having an inverted conical inlet member 254 provided with a circular distribution grid plate 256. The plate 256 is arranged in the lower portion of the vessel 250 and is concentric therewith. The superficial velocity of the upflowing vapors or gases in reaction vessel 250 is selected to produce a dense fluidized mixture 258 having a level 262 superimposed by a dilute or disperse phase 264.

The light suspension in the dilute phase 264 passes to the separating means 266 through inlet line 268 for separating entrained catalyst particles from the gases or vapors. The separated particles are returned to the dense bed or mixture 258 through line 272. The vaporous reaction products are passed overhead through line 274 to suitable separation equipment for recovering desired products.

In the catalytic conversion of hydrocarbons, the separation equipment comprises fractionation equipment.

In this form of reaction vessel the contaminated catalyst particles are withdrawn from the bottom of the dense bed or mixture 258 and passed into a stripping zone 276 arranged between the distribution grid plate 256 and the inner wall of the vessel 250. Stripping gas is introduced into the conical bottom 277 of the reaction vessel 250 through lines 278 for stripping or purging the spent catalyst particles. The stripping gas passes up into the reactor 250.

Fluidizing gas is preferably introduced into the lower portion of the conical bottom 277 through lines 278 and 282 to maintain the catalyst particles in fluidized flowable condition so that they flow into the upper part of a standpipe 284. The standpipe 284 is provided with fluidizing lines 286 for maintaining the catalyst particles in fluidized condition so that they produce hydrostatic pressure at the base of the standpipe 284.

Instead of using the annular stripping zone 276, a system of stripping zones as described in connection with Fig. 1 may be used in Fig. 2. If such a system of stripping zones is used, the standpipe 284 is eliminated as the stripping zones contain a continuous column of dense fluidized particles and with the associated pipes form a standpipe for developing the desired pressure at the base of the column of fluidized solids substantially equal to that produced by the same height of a vertical column.

The standpipe 284 is provided with a safety control valve 288 and a control slide valve 292. The particles are introduced into pipe 294 below the valve 292 and are mixed with a regenerating gas, such as air, introduced through line 302, and a less dense suspension is passed through line 304 into the bottom portion of a regeneration vessel 306 below the distribution grid plate 308 therein.

The particles during regeneration are maintained in a dense fluidized condition indicated at 312 having a level at 314 with a dilute phase or dispersed phase 316 superimposed thereabove. The conditions for maintaining the particles in a dense fluidized condition in the reaction vessel 250 and the regeneration vessel 306 are substantially the same as those described in connection with the reaction vessel 10 and the regeneration vessel 137 respectively in Fig. 1.

The hot regeneration gases containing some entrained catalyst leave the dispersed phase 316 and are passed into separating means 318 through line 322. The separated solids are returned to the dense bed or mixture 312 by dip pipe 324. The hot regeneration gases pass overhead through line 326 and are passed through a heat exchanger 328 provided with a heat exchange element 332 for reducing the temperature of the hot regeneration gases before passing them to the last separation step.

The cooled regeneration gases are passed through line 334 to an electrostatic precipitator 336 wherein substantially all of the solid particles are removed from the regeneration gases. The regeneration gases leave the separator 336 through line 338 and may be passed to the atmosphere or may be passed to a waste heat boiler or other heat recovery system or apparatus. The separated catalyst particles are withdrawn from the separator 336 through line 342 and may be recovered as such or they may be returned to the regeneration zone or vessel 306 or to the reaction vessel 250.

In the form of the invention shown in Fig. 2, the regeneration vessel 306 may be of the same size now used in catalytic cracking units or it may be of a smaller size so that only partial regeneration is carried out in the regeneration vessel 306. If it is of the same size as regenerators now in use, further stage regeneration is carried out in the separate regeneration vessels which will be presently described and which form part of my invention. If a smaller regeneration vessel is used, more regeneration is carried out in the separate stage regeneration vessels presently to be described and forming part of my invention.

The partially regenerated catalyst particles are withdrawn from the lower portion of the fluidized mixture 312 in the regeneration vessel 306 by means of well 348 formed by a partition or baffle 352 which extends above the distribution plate 308 and extends across the regeneration vessel 306. The regenerated catalyst particles in a dense fluidized condition are passed to the upper portion of pipe or conduit 354 wherein the particles are maintained in a fluidized condition by the upward passage of an aerating and regenerating gas.

A gas, such as air or other regenerating gas, may be introduced through line 356 and distribution ring 358 provided with openings for introducing the gas into the lower portion of the pipe or conduit 354. However, as pointed out above in the description of Fig. 1 and vessel 46, about half of the gas from the next lower regeneration vessel 364 presently to be described, passes upwardly through line 354 and is usually sufficient to maintain the particles fluidized.

From the bottom of the pipe or conduit 354 the fluidized partially regenerated particles pass downwardly through inclined conduit 362 for introducing the partially regenerated particles into a separate regeneration vessel 364. Regenerating gas, such as air, is passed through line 366 and introduced into the bottom portion of the regeneration vessel 364 by means of a distribution ring having openings 368. Other forms of distributing means may be used. The particles in the regeneration vessel 364 are maintained in a dense fluidized condition having a level at 372. It will be noted that the level 372 is above the outlet end of the inclined pipe 362.

The superficial velocity of the regenerating gas passing upwardly through the regenerating vessel 364 may be between about 0.5 ft./second and 2.0 ft./second, and when regenerating synthetic silica alumina gel in finely divided form as above described, the density of the mixture in the regeneration zone 364 may be between about 12 lbs./cu. ft. and 30 lbs./cu. ft.

The disperse phase 373 in the upper part of the regeneration vessel 364 comprises a light suspension which is passed into separating means 374 through inlet 376 for separating some of the entrained catalyst particles from the regeneration gas. The separated solid particles are collected in the separating means 374 and returned to the dense bed or mixture 370 by dip pipe 378. The regeneration gas passes overhead from the separating means 374 through line 382 provided with a throttle control valve 384. The throttle control valve comprises a pressure responsive element 386 in the cyclone separator 374, a pressure responsive element 388 in the conduit 362, means 390 diagrammatically shown for connecting the pressure responsive elements and control means 392 diagrammatically shown for connecting the line 390 with and for controlling the control valve 384. The purpose of the control valve and its associated parts is the same as that described in connection with the first stripping vessel 46 in Fig. 1.

The regeneration gas passing through line 382 may be passed through valved line 394 into the dilute phase 316 in the upper part of the regeneration vessel 306 or it may be passed through valved line 396 for introduction into line 326 for carrying regeneration gases from the upper portion of the regeneration vessel 306 to the last separation step 336.

From the bottom of the first regeneration vessel 364 the partially regenerated catalyst or contact particles pass in a confined stream as a dense fluidized mixture through inclined conduit 398 for introducing the particles into a second regeneration vessel 402 arranged at a lower level than the first regeneration vessel 364 and offset with respect thereto. Regenerating gas, such as air, is passed through line 404 and introduced into the lower portion of the second regeneration vessel 402 by means of a distribution ring having openings 406. Other forms of distributors may be used.

The particles undergoing regeneration in the second regeneration vessel 402 are maintained in a dense fluidized condition shown at 407 with a level at 408. The process is carried out so that the level 408 is always above the outlet end of conduit 398. Above the level 408 is a light suspension or disperse phase in which the regeneration gases contain only a small amount of entrained regenerated catalyst particles. This light suspension is passed into separating means 412 through inlet 414 for recovering most of the solid particles from the regeneration gas. The separated solid particles are returned to the dense bed or mixture 407 in the second regeneration vessel 402 through dip pipe 416.

As above pointed out in connection with vessel 364 and pipe 304, half of the total gas in vessel 402 is passed to line 398 and vessel 364 and the other half is passed upwardly to dilute phase 410. The gas passing to vessel 364 contains some oxygen and so is useful as a regenerating gas in vessel 364 in addition to the regenerating gas introduced into vessel 364 through line 366.

The hot regeneration gases following the separation step pass overhead through line 418 provided with a throttle control valve 422. Associated with the control valve is a pressure responsive element 424 arranged in the separating means 412 in the upper portion of the second regeneration vessel 402, a second pressure responsive element 426 in the conduit 398, means 428 connecting the pressure responsive elements 424 and 426 and control means diagrammatically shown at 432 for connecting line 428 with control valve 422.

The regeneration gases leaving the separation means 412 in the second regeneration vessel 402 pass upwardly through line 418 and are preferably combined with the regeneration gas passing through line 382 from the first regeneration vessel and then passed either to the top of the regeneration vessel 306 or the line 326 leaving the top of the regeneration vessel 306.

The bottom portion of the second regeneration vessel 402 has its diameter reduced by inclined wall 434. Arranged below the reduced portion is a safety slide valve 436 and a control valve 438. The hot regenerated particles are introduced into pipe 439 below the control valve 438 and mixed with a gaseous fluid introduced through line 442 to form a less dense suspension which is then passed through line 252 and into the bottom portion of the reaction vessel 250 as above described. In the catalytic cracking of hydrocarbons, the hydrocarbon oil may be introduced through line 442 as a vapor, a liquid, or as a mixture of vapor and liquid. If desired, a suspending gas, such as steam, may be introduced through line 442 to form the less dense suspension and the hydrocarbon oil to be cracked or converted may be introduced into the dense bed or mixture 258 in the reaction vessel 250.

As above pointed out in the description of the apparatus shown in Fig. 1, the dense fluidized solids in pipe 354 and vessels 364 and 402 form a continuous column and produce a hydrostatic head of pressure equivalent to that produced by the same height of a vertical column.

As above pointed out in connection with the description of Fig. 1, the vessels 364 and 402 may be provided with cylindrical baffles or transverse baffles to minimize swirling or eddy currents when the vessels have a large diameter.

It is also within the contemplation of my invention to substitute my stage regeneration system for the large regeneration vessels, such as shown at 306 in Fig. 2 so that large regenerators can be eliminated. In such a system the catalyst suspension from line 304 would be passed to a solid-gas separation means and separated catalyst would be passed to column 354 or to a hopper feeding column 354. With the elimination of the large regenerator, more separate vessels like 364 and 402 would be needed for the separate stages. The solids undergoing regeneration in the separate stages are maintained as a continuous column of dense fluidized particles to produce hydrostatic pressure at the base of the lowest vessel substantially equal to the same height of a vertical column of fluidized particles and hence no standpipe is needed for developing this pressure.

While the invention has been particularly described in connection with the catalytic conversion of hydrocarbons, it is to be understood that the invention may be used with other reactions as, for example, drying of solids, regeneration of drying materials (solids), fluid hydroforming, gasification of coal, distillation of oil from shale, etc.

Instead of having the vessels or sections 46 and 94 in Fig. 1 and 364 and 402 in Fig. 2 offset with respect to one another, they may be arranged one below the other in direct vertical alignment. While I have shown only two separate vessels in Figs. 1 and 2 for the stage stripping (Fig. 1) or stage regeneration (Fig. 2), it is to be understood that more stages may be used, if desired.

While I have described specific forms of my invention and have given a specific example of operating conditions, it is to be understood that these are by way of illustration only and that various changes and modifications may be made without departing from the spirit of my invention.

I claim:

An apparatus of the character described including a vertical reaction vessel comprising an inlet for the supply of gaseous fluid and solid contact particles to the lower portion of said reaction vessel, an outlet for gaseous reaction products in the top and an outlet for the withdrawal of solid contact particles in the bottom of said reaction vessel, a first stripping vessel arranged below said reaction vessel, an inlet for the introduction of solid contact particles intermediate the ends of said first stripping vessel, a conduit connecting said outlet in the bottom of the reaction vessel with said inlet in the first stripping vessel, an inlet for the supply of gaseous stripping agent in the lower part of said first stripping vessel, an outlet line for the withdrawal of stripping agent and stripped material leaving the top of said first stripping vessel, first pressure responsive means and a throttle valve in said outlet line from said first stripping vessel, second pressure responsive means in the lower portion of said conduit leading to said first stripping vessel, control means connected with said two pressure responsive means and with said throttle valve for maintaining a selected pressure in the top of said first stripping vessel and for maintaining the pressure at said first pressure responsive means at a lower level than at said second pressure responsive means, a second stripping vessel arranged below and laterally of said first stripping vessel, an inlet for the introduction of solid contact particles intermediate the ends of said second stripping vessel, an inclined conduit connecting the bottom of said first stripping vessel with said inlet in the second stripping vessel for conveying solid contact particles to said second stripping vessel, an inlet for the supply of gaseous stripping agent in the lower part of said second stripping vessel, a gas outlet line for the withdrawal of stripping agent and stripped out material in the top of said second stripping vessel, a second throttle valve in said gas outlet line from said second stripping vessel, third pressure responsive means in said gas outlet line from said second stripping vessel, fourth pressure responsive means in the lower portion of said inclined conduit leading to said second stripping vessel, control means connected with said third and fourth pressure responsive means and with said second throttle valve for maintaining a selected pressure in the top of said second stripping vessel and for maintaining the pressure at said third pressure responsive means at a lower level than at said fourth pressure responsive means, and a valve controlled outlet line connected to the bottom of said second stripping vessel for controlling the withdrawal of solid particles from said second stripping vessel.

JOHN WEIKART.

REFERENCES CITED

The following references are of record in the file of this patent:

UNITED STATES PATENTS

| Number | Name | Date |
|---|---|---|
| 1,984,380 | Odell | Dec. 18, 1934 |
| 2,367,281 | Johnson | Jan. 16, 1945 |
| 2,367,694 | Snuggs | Jan. 23, 1945 |
| 2,391,336 | Ogorzaly | Dec. 18, 1945 |
| 2,391,944 | Carlsmith | Jan. 1, 1946 |
| 2,394,710 | McAfee | Feb. 12, 1946 |
| 2,394,814 | Snuggs | Feb. 12, 1946 |
| 2,408,943 | Mekler | Oct. 8, 1946 |
| 2,409,353 | Giuliani et al. | Oct. 15, 1946 |
| 2,409,707 | Roetheli | Oct. 22, 1946 |
| 2,414,002 | Thomas et al. | Jan. 7, 1947 |
| 2,414,852 | Burnside et al. | Jan. 28, 1947 |
| 2,419,323 | Meinert et al. | Apr. 22, 1947 |
| 2,422,793 | McAfee | June 24, 1947 |
| 2,425,807 | Jahnig | Aug. 19, 1947 |
| 2,429,721 | Jahnig | Oct. 28, 1947 |
| 2,451,619 | Hengstebeck et al. | Oct. 19, 1948 |
| 2,461,343 | Ogorzaly et al. | Feb. 8, 1949 |
| 2,490,993 | Borcherding | Dec. 13, 1949 |

FOREIGN PATENTS

| Number | Country | Date |
|---|---|---|
| 118,399 | Australia | Apr. 12, 1944 |